United States Patent
Roussel

(10) Patent No.: US 12,480,578 B2
(45) Date of Patent: Nov. 25, 2025

(54) ACTUATOR FOR A LAND-BASED MOTOR VEHICLE COMPONENT

(71) Applicant: ELECTRICFIL AUTOMOTIVE, Beynost (FR)

(72) Inventor: Laurent Roussel, Saint-Priest (FR)

(73) Assignee: ELECTRICFIL AUTOMOTIVE, Beynost (FR)

(*) Notice: Subject to any disclaimer, the term of this patent is extended or adjusted under 35 U.S.C. 154(b) by 21 days.

(21) Appl. No.: 18/252,421

(22) PCT Filed: Nov. 18, 2021

(86) PCT No.: PCT/FR2021/052031
§ 371 (c)(1),
(2) Date: May 10, 2023

(87) PCT Pub. No.: WO2022/106783
PCT Pub. Date: May 27, 2022

(65) Prior Publication Data
US 2023/0417322 A1   Dec. 28, 2023

(30) Foreign Application Priority Data
Nov. 20, 2020 (FR) .................................. 2011944

(51) Int. Cl.
*F16H 61/32* (2006.01)
*F16H 63/34* (2006.01)

(52) U.S. Cl.
CPC ......... *F16H 61/32* (2013.01); *F16H 63/3466* (2013.01)

(58) Field of Classification Search
CPC ........ F16H 61/32; F16H 63/3466; F16H 1/46; F16H 2057/02082; F16H 2025/2087
See application file for complete search history.

(56) References Cited

U.S. PATENT DOCUMENTS

| 4,651,580 A * | 3/1987 | Deane ...................... H02K 7/06 |
| | | 475/299 |
| 8,975,793 B2 * | 3/2015 | Palfenier ................ H02K 7/116 |
| | | 310/68 B |

(Continued)

FOREIGN PATENT DOCUMENTS

| DE | 4220246 A1 * | 12/1993 | ............ F02D 11/107 |
| FR | 3 074 757 A1 | 6/2019 | |

(Continued)

OTHER PUBLICATIONS

International Search Report, dated Mar. 2, 2022, corresponding to International Application No. PCT/FR2021/052031.

*Primary Examiner* — Derek D Knight
(74) *Attorney, Agent, or Firm* — Ladas & Parry LLP; Malcolm J. MacDonald, Esq.

(57) ABSTRACT

The invention relates to an actuator comprising at least one epicyclic gear stage (28, 28.1, 28.2), and including an angular position sensor (42) comprising a target (46) mounted in a secured manner on a connecting rod (52) which is secured in rotation to a output mechanical connector (24) of the actuator (10),
characterized in that the input component of the epicyclic gear stage is guided in rotation on the connecting rod (52) with a first positive diametrical guide clearance ("jg1") relative to the main axis (A2),
in that the output component of the epicyclic gear stage is rigidly connected to the connecting rod (52),
and in that a rotatable assembly of the epicyclic gear stage (28) is positioned relative to the actuator casing (12) with a diametrical displacement clearance ("jd") which is at least 3 times greater than the first diametrical guide clearance ("jg1").

19 Claims, 4 Drawing Sheets

(56) References Cited

U.S. PATENT DOCUMENTS

| | | | |
|---|---|---|---|
| 2005/0064980 A1 | | 3/2005 | Hoshi |
| 2014/0021808 A1* | | 1/2014 | Palfenier ................ H02K 5/203 |
| | | | 310/43 |

FOREIGN PATENT DOCUMENTS

| | | |
|---|---|---|
| JP | 2002-349705 A | 12/2002 |
| WO | 2019030856 A1 | 2/2019 |
| WO | 2019/099378 A1 | 5/2019 |

* cited by examiner

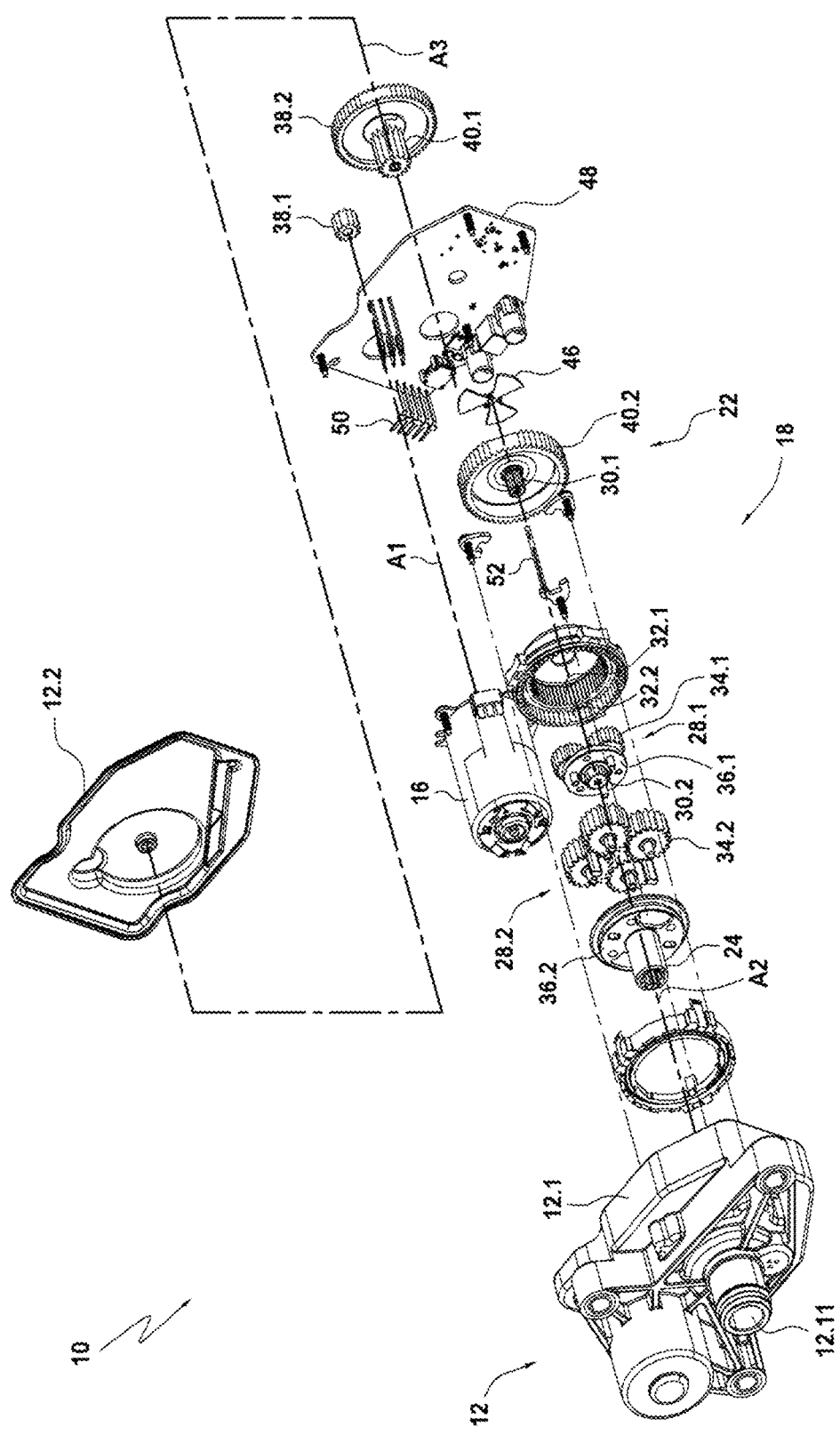
[Fig.1]

[Fig. 2]
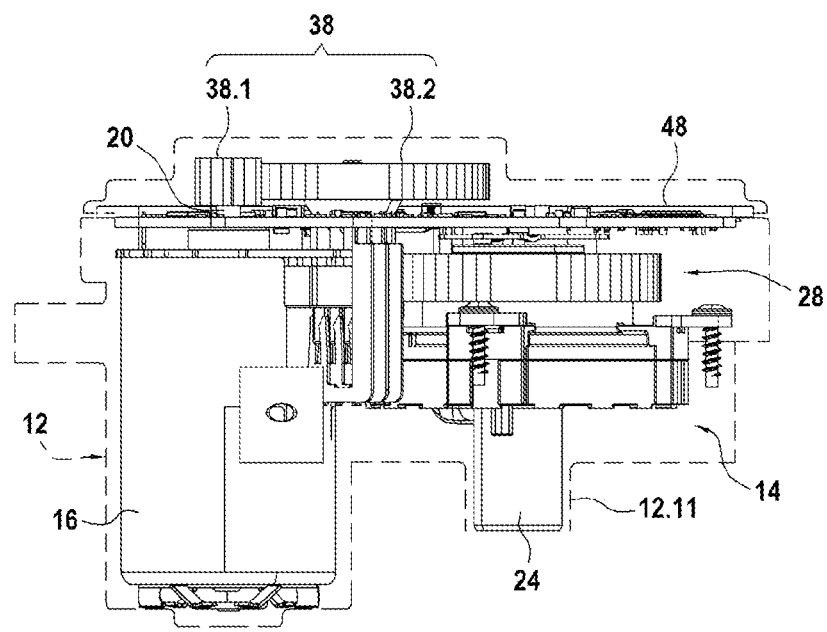
[Fig. 3]
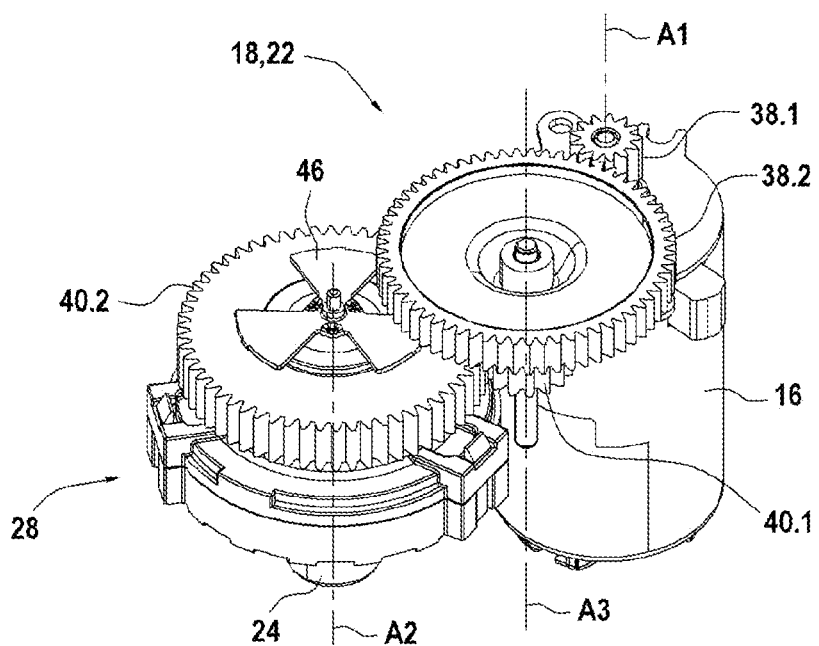

[Fig. 4]
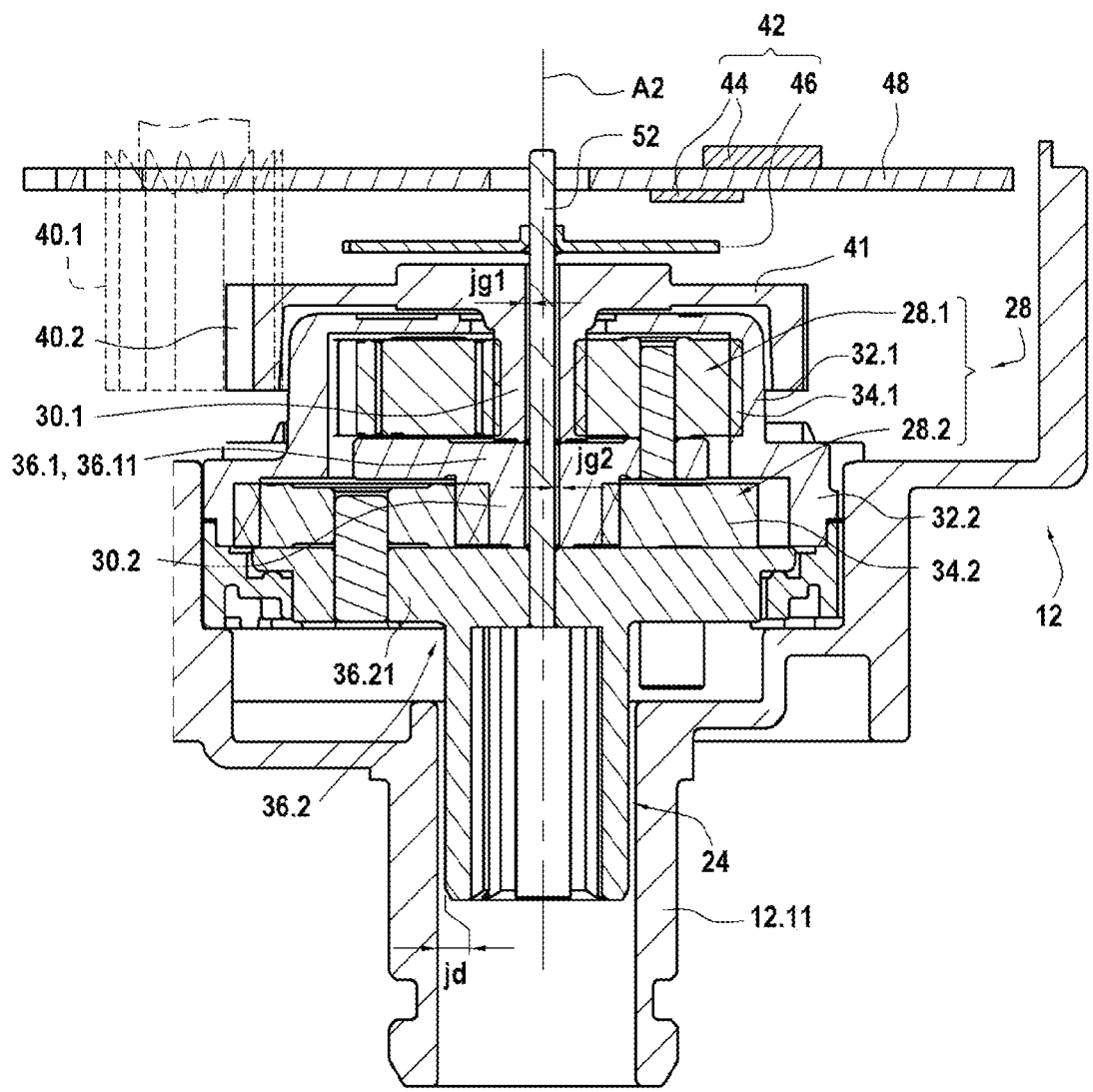

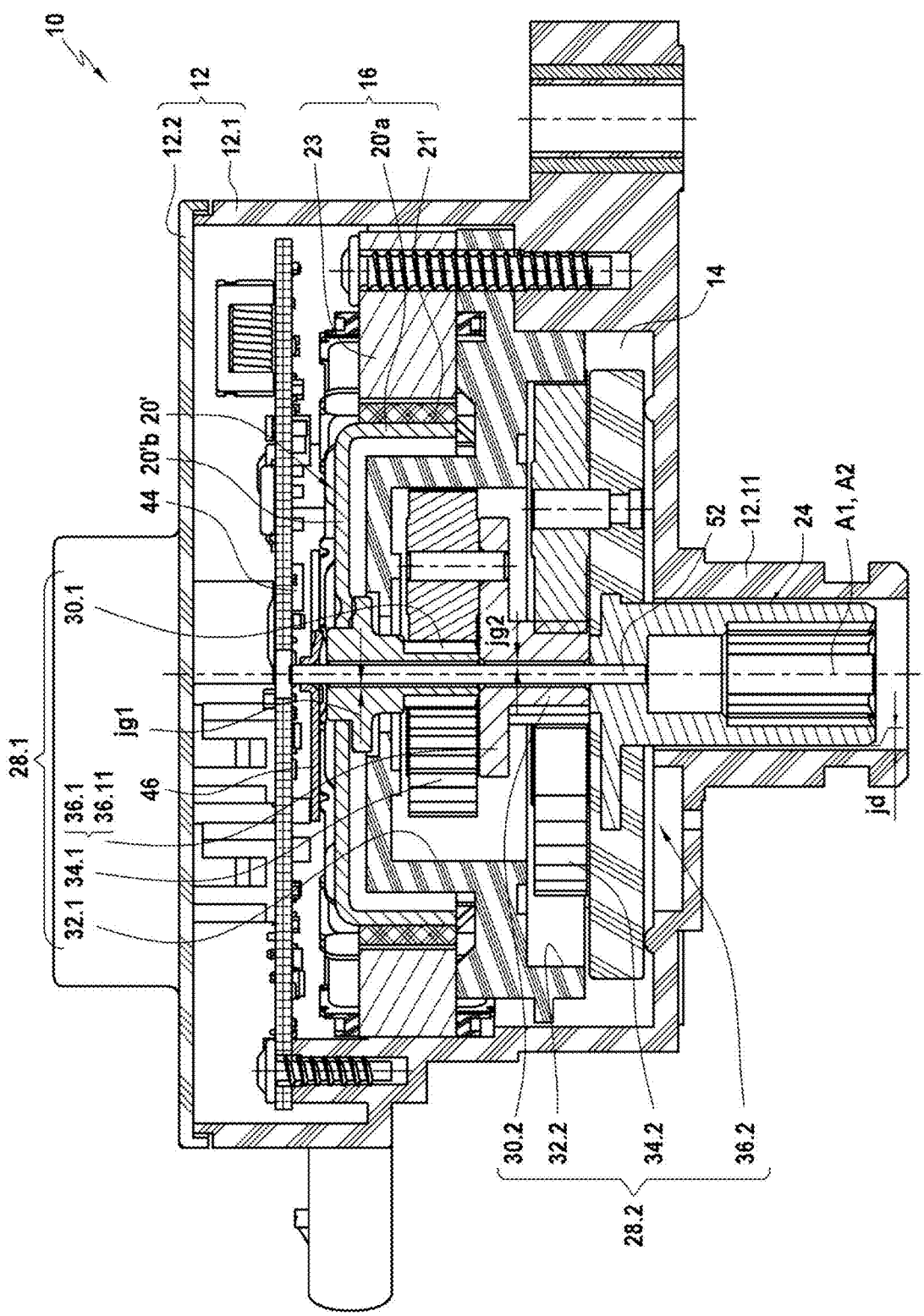
[Fig. 5]

ACTUATOR FOR A LAND-BASED MOTOR VEHICLE COMPONENT

TECHNICAL FIELD

The invention relates to the field of actuators for actuating a member of a land motor vehicle.

This type of vehicle must meet well-known usage constraints, but also known economic constraints which require in particular the use, for all the members of the vehicle, of construction and assembly techniques compatible with all the constraints. In particular, the constraints of production costs are taken into account by those skilled in the art when they seek to design members for these vehicles.

In general, in this field, the actuators envisaged in the invention include a casing which delimits an internal volume in which at least an electric motor and an internal mechanical transmission are arranged. The internal mechanical transmission makes it possible to transmit a motion generated by the electric motor to an output member of the actuator which will control the movement of another member of the vehicle, associated with this actuator. When it is desired to transit high torque values while maintaining a reduced space requirement, a mechanical transmission comprising at least one epicyclic gear stage, for example a single or multiple epicyclic train, can be used. Thus, an epicyclic gear stage can for example include two or more epicyclic gear trains in series. The internal mechanical transmission can include several successive gear stages, with at least one gear stage in addition to at least one epicyclic gear stage, an output component of a first gear stage driving an input component of a second gear stage.

Such an internal mechanical transmission makes it possible to obtain a high reduction ratio between the speed of rotation of the electric motor and the speed of rotation of an output shaft of the actuator. Conversely, for a given motor torque delivered by the electric motor, the torque available on the output shaft is considerably greater.

Besides, it is often necessary to know the position of the member of the vehicle which is driven by the actuator. An angular position sensor is used for this purpose.

It is advantageous that the angular position sensor is integrated into the actuator since very often this sensor is used to pilot the actuator, in particular to pilot the electric motor. Likewise, it is advantageous that at least part of the circuit for electronically controlling the actuator is partly integrated into the actuator. Therefore, there is often, in such an actuator, a printed circuit board on which electronic components of the circuit for electronically controlling the electric motor are arranged. If the actuator integrates a position sensor, it is advantageous that at least some of the electronic components of the sensor are arranged in the vicinity of those for controlling the motor. Thus, it is generally provided that the position measurement is done by measuring the angular position of the motor shaft of the electric motor, or of a component of the internal mechanical transmission which is arranged in the vicinity of the motor, in particular in terms of proximity in the kinematic chain of the transmission. In this way, the speed of rotation of an input component of the internal mechanical transmission is often measured.

However, when the internal mechanical transmission of the actuator has a very high step-up, with a speed ratio between the input and the output of the mechanical transmission which can be greater than or even greater than 50, the measurement error at the level of the input results in an evaluation error of the output of the transmission which is, to put it simply, multiplied by this same ratio.

In documents WO-2019/099378 or U.S. Pat. No. 8,975,793, actuators are described comprising an internal mechanical transmission having an epicyclic gear stage made in the form of at least one epicyclic train. In these two documents, the output component of the epicyclic gear train is a peripheral ring gear with internal gear teeth. Document US 2014/021808 A1 describes an actuator similar to the one described in document U.S. Pat. No. 8,975,793.

Document WO-2019/099378 describes an actuator having an internal mechanical transmission including an epicyclic gear stage with two epicyclic trains. The input component of the first epicyclic train is a pinion which is secured to a stepped part forming a rotor body of the motor. This rotor body, here in the form of a hollow shaft, is mounted in rotation by a ball bearing on a protrusion belonging to an intermediate partition forming part of an inner partition belonging to the casing of the actuator. Thus, the rotor of the electric motor, and therefore its rotor body and the pinion which forms the input component of the first epicyclic train, are guided in rotation relative to an element of the casing. The output component of the second epicyclic train consists of the peripheral ring gear with internal gear teeth of the second epicyclic train, which is guided in rotation in a lower portion of the casing by means of a ball bearing. This device includes an angular position sensor including a detector and a magnetic target. The magnetic target of the angular position sensor is arranged behind the entire double epicyclic train mechanism and the electric motor. The magnetic target is mounted in a secured manner on a connecting rod which is secured in rotation to the output mechanical connector of the actuator and which is also secured to the output component of the second epicyclic train. The rod therefore axially passes through the assembly formed by the epicyclic gear stage with double epicyclic train and by the electric motor, along its main axis. It is noted that the connecting rod is free relative to the entire epicyclic gear stage with double epicyclic train, of course with the exception of its output component. The rotational guidance of the assembly, formed by the epicyclic gear stage with double epicyclic train and by the electric motor, is ensured by a ball bearing mounting, the ball bearings being themselves guided in the casing. It is understood that the design of the rotational guidance of the assembly formed by the epicyclic gear stage with double epicyclic train and by the electric motor, using ball bearing guidance on the casing, leads to a complexity in the design and assembly of the parts. In addition, it requires perfect positioning between the upper and lower portions of the casing. As such perfect positioning cannot be achieved, the double epicyclic train mechanism can be subjected to uncontrolled and parasitic internal forces due to misalignments between the input and output components in particular.

Document U.S. Pat. No. 8,975,793 also describes a mechanical transmission including an epicyclic gear stage with two epicyclic trains in series. The design of the rotational guidance of the assembly of the epicyclic gear stage with double epicyclic trains is ensured in the same way as in the previous document, with an input pinion of the epicyclic gear stage which is secured in rotation to a rotor body mounted in the casing by a pair of ball bearings, and an output component which is also guided by a ball bearing in a lower section of the casing. Here again, the design and assembly of the device are complex, and the epicyclic gear stage with double epicyclic trains can be subjected to uncontrolled and parasitic internal forces, due for example in particular to misalignments between the input and output components.

Document WO-2019/030856 A1 also describes an actuator having an epicyclic train through which a connecting rod passes, one end of which is connected to the output component of the actuator. The end of the connecting rod on the side of the output component is guided by a needle bearing, which by definition constitutes a system without any radial displacement, not only at the level of the needle bearing, but also a fully and rigidly guided system, without the possibility of pivoting about an axis perpendicular to the axis of rotation, since this is a property of the needle bearings compared to the ball bearings.

The aim of the invention is to propose an actuator architecture which makes it possible to implement an internal mechanical transmission to the casing of the actuator with a very high step-up ratio between the speed of the motor and the speed of the output member of the mechanical transmission, and which makes it possible to accurately measure the angular position of the output member of the internal mechanical transmission by measuring means which can be integrated into the sensor in an economical manner. The invention therefore aims to propose a new design of an actuator for a member of a land motor vehicle, in particular for a land motor vehicle having an unladen weight of less than 2.5 tons, which is both compact and economical to produce, and aims to reduce the parasitic forces in the at least one epicyclic gear stage.

DISCLOSURE OF THE INVENTION

Thus, the invention proposes an actuator for a member of a land motor vehicle, of the type including an actuator casing which delimits an internal volume in which are arranged:
 at least one electric motor having a motor output part, the motor output part having an axis of rotation,
 and a mechanical transmission comprising at least one reduction gear train to transmit a motion of the motor output part of the electric motor to an output mechanical connector of the actuator.

The reduction gear train includes at least one epicyclic gear stage, having an input component and an output component which are rotatable relative to the casing about a main axis, and at least one set of planet gear wheels. This at least one set of planet gear wheels is mechanically interposed between the input component and the output component of the epicyclic gear stage. The speed of rotation of the input component is greater than the speed of rotation of the output component.

The input component is mechanically connected to the motor output part by a mechanical connection which is arranged behind the at least one set of planet gear wheels along the direction of the main axis, and the output mechanical connector is intended to be connected to the member of the land motor vehicle by a mechanical connection towards the front of the at least one set of planet gear wheels along the direction of the main axis.

The actuator includes an angular position sensor including a detector and a target. The target of the angular position sensor is arranged behind the at least one set of planet gear wheels along the direction of the main axis of the epicyclic gear stage and is mounted in a secured manner on a connecting rod which is secured in rotation to the output mechanical connector of the actuator; and which axially passes through the epicyclic gear stage along its main axis.

In the invention, the input component of the epicyclic gear stage is guided in rotation on the connecting rod with a first positive diametrical guide clearance relative to the main axis. The output component of the epicyclic gear stage is rigidly connected to the connecting rod. At least one fixed component of the epicyclic gear stage is connected without clearance to the actuator casing.

In the invention, the input component and the output component of the epicyclic gear stage belong to a rotatable assembly of the epicyclic gear stage which is positioned relative to the actuator casing, diametrically relative to the main axis, with a positive diametrical displacement clearance relative to the main axis, the diametrical displacement clearance being at least 3 times greater than the first diametrical guide clearance.

Other optional characteristics of the invention, taken alone or in combination, are listed below.

The diametrical displacement clearance can be at least 5 times greater than the first diametrical guide clearance.

The first diametrical guide clearance relative to the main axis is for example less than or equal to 0.05 millimeters, and the diametrical displacement clearance relative to the main axis is then for example greater than or equal to 0.2 millimeter.

The epicyclic gear stage can include an epicyclic train including a first gear wheel and a second gear wheel each having a symmetrical axis of revolution which coincides with the main axis, and including at least one set of planet gear wheels mounted in free rotation on a planet gear carrier, and the planet gear carrier can then form the output component of the epicyclic gear stage.

The epicyclic gear stage can include several epicyclic trains in series. In such a case, the epicyclic trains in series of the epicyclic gear stage can each include a first gear wheel and a second gear wheel each having a symmetrical axis of revolution that coincides with the main axis, and can each include at least one set of planet gear wheels mounted in free rotation on a planet gear carrier, and the planet gear carrier of a last of the epicyclic trains can then form the rotatable output component of the epicyclic gear stage.

A first epicyclic train of the epicyclic gear stage can include a first gear wheel with external gear teeth which forms the rotatable input component of the epicyclic gear stage, and the first epicyclic train and the last epicyclic train can each include a second gear wheel with internal gear teeth which are fixed components of the epicyclic gear stage and which are connected without clearance to the actuator casing.

The first epicyclic train can include a planet gear carrier which carries a set of planet gear wheels of the first epicyclic train and which is guided in rotation on the connecting rod with a guide clearance.

A last epicyclic train of the epicyclic gear stage can include a first gear wheel with external gear teeth which is guided in rotation on the connecting rod with a guide clearance.

The rotatable assembly of the epicyclic gear stage can be, behind the epicyclic gear stage, free in rotational guidance and free in diametrical positioning.

In a set of planet gear wheels of an epicyclic train, the planet gear wheels are for example angularly distributed in a uniform manner about the main axis.

The axis of rotation of the motor output part of the electric motor can be parallel to the main axis.

The actuator can include a printed circuit board which carries the detector of the angular position sensor and which is arranged in a plane perpendicular to the main axis, behind the at least one set of planet gear wheels, and the target can be arranged on the connecting rod facing a front face of the printed circuit board.

The electric motor can be arranged in front of the printed circuit board which carries the detector of the angular position sensor.

The reduction gear train can include at least one gear stage which is arranged behind the printed circuit board which carries the detector of the angular position sensor.

The motor output part can be arranged at the rear of the electric motor.

The gear stage which is arranged behind the printed circuit board can include a motor pinion which is secured to a motor output shaft, which axially passes through the plane of the printed circuit board.

The axis of rotation of the motor output part of the electric motor can be perpendicular to the main axis or coaxial with the main axis.

The angular position sensor may be an Eddy current sensor.

BRIEF DESCRIPTION OF THE DRAWINGS

FIG. 1 is an exploded perspective view of one embodiment of the invention.

FIG. 2 represents a sectional view of the embodiment of FIG. 1, by a plane containing the axis of rotation of the electric motor and the main axis.

FIG. 3 represents a perspective view of some elements of the embodiment of FIG. 1.

FIG. 4 represents a cross-sectional view of the epicyclic gear stage of the embodiment of FIG. 1, through a plane containing the main axis.

FIG. 5 is a view similar to that of FIG. 4 and represents a sectional view of the epicyclic gear stage of a second embodiment, through a plane containing the main axis.

DESCRIPTION OF THE EMBODIMENTS

The invention relates to an actuator 10 for a member of a land motor vehicle, for example for a motor vehicle having an unladen weight of less than 2.5 tons. The considered member is for example a system for locking the transmission of the vehicle, used to immobilize the parked vehicle. Such a locking system can include a mechanism of the bolt-striker type in which a movable bolt, carried by a first element, is engaged or withdrawn from a striker, carried by a second element, along a direction substantially perpendicular to a direction of relative movement of the two elements. When the bolt is engaged in the striker, it immobilizes the relative motion between the two elements which carry respectively the bolt and the striker. When the bolt is disengaged from the striker, it makes the relative motion possible between the two elements. In some cases, the unlocking must be done under effort, with frictional forces between the bolt and the striker which require a significant effort to remove the bolt from the striker, therefore requiring a mechanism for actuating the bolt having an actuator capable of delivering a force or a torque of significant value. Of course, in a bolt-striker system, it is possible to have the movable striker relative to a stationary bolt, or have a striker and a bolt both movable relative, for example, to a fixed frame.

The two variants of the actuator 10 illustrated in the figures include an actuator casing 12 which delimits an internal volume 14 in which are arranged:

at least one electric motor 16 having a motor output part which can for example take the form, inter alia, of a motor shaft 20, as in the first example of FIGS. 1 to 4 or, of a rotor body 20', as in the second example of FIG. 5, the motor output part 20, 20' having an axis of rotation A1 corresponding to the axis of rotation of the rotor of the electric motor 16;

and an internal mechanical transmission 18 comprising at least one reduction gear train 22 to transmit a motion of the motor output part of the electric motor 16 to an output mechanical connector 24 of the actuator 10.

In the examples, the internal mechanical transmission 18 is entirely contained within the actuator casing 12. In the examples, the casing is in the form of a main casing body 12.1 and of a rear cover 12.2. The internal volume 14 delimited by the casing 12 is a volume which is closed, with the exception of an output well 12.11 arranged in a front wall of the main casing body 12.1. In the examples, the internal mechanical transmission 18 receives a rotatable motion communicated by the motor output part 20, 20', and delivers, at the output of the actuator 10, a rotatable motion at the level of the output mechanical connector 24. The output mechanical connector 24 leaves the internal volume through the output well 12.11 or is accessible from outside the casing 12 through the output well 12.11. Preferably, the internal mechanical transmission 18 operates as a speed reducer by ensuring a step-down ratio, which is defined, for the internal mechanical transmission 18 as a whole, as being the speed of rotation of the motor output part 20 divided by the speed of rotation of the output mechanical connector 24, which is preferably greater than or equal to 10, more preferably greater than or equal to 50.

To ensure the desired level of reduction of the speed of rotation, the reduction gear train 22 includes at least one epicyclic gear stage 28.1, 28.2, having an input component 30.1 and an output component 36.2 which are rotatable relative to the casing about a main axis A2, and at least one set of planet gear wheels 34.1, 34.2 which is mechanically interposed between the input component 30.1 and the output component 36.2. In a known manner, the planet gear wheels are driven in an orbital motion to transform a rotatable motion of the input component 30.1 into a rotatable motion of the output component 36.2, the speed of rotation of the input component 30.1 being greater than the speed of rotation of the output component 36.2.

The epicyclic gear stage 28 can for example comprise a single epicyclic train or several epicyclic trains in series.

In one embodiment, not illustrated in the figures, the epicyclic gear stage 28 can comprise a single epicyclic train including a first gear wheel and a second gear wheel each having a symmetrical axis of revolution. The symmetrical axis of revolution of the first gear wheel and of the second gear wheel would merge and coincide with the main axis A2 (implied within the operating tolerances). The epicyclic train includes at least a set of planet gear wheels mounted in free rotation on a planet gear carrier, each about an axis parallel to but distinct from the main axis A2. In such a case, one among the first gear wheel, the second gear wheel and the planet gear carrier forms the input component of the epicyclic gear stage 28, while another among the first gear wheel, the second gear wheel and the planet gear carrier forms the output component of the epicyclic gear stage 28. Generally, the third among the first gear wheel, the second gear wheel and the planet gear carrier, is fixed in rotation relative to the casing.

In the two examples more particularly illustrated respectively in FIGS. 1 to 4 and in FIG. 5, the epicyclic gear stage 28 includes several epicyclic trains, mechanically arranged in series, in this case two epicyclic trains mechanically arranged in series, namely a first epicyclic train 28.1 and a second epicyclic train 28.2, the second epicyclic train 28.2 therefore being the last epicyclic train of the epicyclic gear stage 28.

In the following, the notions of upstream and downstream refer to the direction of the sequence of the various elements of the internal mechanical transmission 18, in terms of positioning in the transmission of motion, in the direction going from the motor output part 20 of the electric motor 16 to the mechanical connector 24. Moreover, the notions of front and rear refer to the positioning of the different parts of the actuator in the casing 12 along the direction of the main axis A2, making it possible to indicate a relative positioning of these different parts along this main axis A2. Arbitrarily, it is considered that, in the examples illustrated, the output mechanical connector 24 of the actuator 10 is arranged forward relative to the epicyclic gear stage 28 along the main axis A2.

Thus, as can be more particularly seen respectively in FIGS. 1 and 4 and in FIG. 5, the epicyclic trains 28.1, 28.2 in series of the epicyclic gear stage 28 each include a first gear wheel 30.1 30.2 and a second gear wheel 32.1, 32.2 each having a symmetrical axis of revolution which coincides with the main axis A2 (implied within the operating tolerances), and each include a set of planet gear wheels 34.1, 34.2 which are mounted in free rotation on a planet gear carrier 36.1, 36.2, each of the planet gear wheels 34.1, 34.2 being thus mounted on the corresponding planet gear carrier while being movable in rotation about its own axis of rotation parallel to the main axis A2 but distinct therefrom. In each epicyclic train 28.1, 28.2, the planet gear wheels 34.1, 34.2 of the set of planet gear wheels simultaneously mesh with the first gear wheel and the second gear wheel of the epicyclic gear train considered. Each of the planet gear wheels 34.1, 34.2 of a given epicyclic train forms, for this epicyclic train, an orbital component which is driven, in operation, by an orbital motion about the main axis A2, that is to say a motion consisting of a rotation of the planet gear wheel about its own axis, which is itself driven by a rotational motion about the main axis A2. One among the first gear wheel 30.1, the second gear wheel 32.1 and the planet gear carrier 36.1 of the first epicyclic train 28.1 forms the rotatable input component of the epicyclic gear stage 28, while one among the first gear wheel 30.2, the second gear wheel 32.2 and the planet gear carrier 36.2 of the second epicyclic train 28.2 forms the rotatable output component of the epicyclic gear stage 28. In the two illustrated examples, the first epicyclic train 28.1 is thus arranged behind the second epicyclic train 28.2 along the direction of the main axis A2.

It is noted that, in the illustrated embodiments, which have two epicyclic trains in series, each of the two epicyclic trains includes its own set of planet gear wheels, and its own planet gear carrier. However, the invention can be implemented with two epicyclic trains in series including at least one common component, for example a set of common planet gear wheels or a common planet gear carrier.

In the examples illustrated, the input component 30 of the epicyclic gear stage 28 is mechanically connected to the motor output part 20, 20' by a mechanical connection which, in the first exemplary embodiment which is illustrated in FIGS. 1 to 4, includes for example at least one upstream gear stage but which, in the second example illustrated in FIG. 5, is a direct mechanical connection.

In the first example illustrated in FIGS. 1 to 4, the internal mechanical transmission 18 includes, upstream of the epicyclic gear stage 28, a first upstream gear stage 38 and a second upstream gear stage 40. The first upstream gear stage 38 includes a motor output pinion 38.1 which is directly mounted on the motor shaft 20 and which meshes with a downstream gear wheel 38.2 rotatable in the casing 12 about an intermediate axis A3. The intermediate axis A3 is here parallel to the axis A1 of the electric motor 16 and to the main axis A2. In this first example, the second upstream gear stage 40 includes an upstream gear wheel 40.1 which is secured to and coaxial with the downstream gear wheel 38.2 of the first upstream gear stage 38, therefore rotatable in the casing 12 about the intermediate axis A3. This upstream gear wheel 40.1 of the second upstream gear stage 40 cooperates with a downstream gear wheel of the second upstream gear stage 40 which, as will be seen later, drives the input component 30.1 of the epicyclic gear stage 28.

As illustrated in FIG. 4 and FIG. 5, the first epicyclic train 28.1 thus includes, in the two illustrated embodiments, a first gear wheel 30.1 in the form of a central pinion with external gear teeth and a second gear wheel 32.1 in the form of a ring gear with internal gear teeth, with three planet gear wheels 34.1 which are arranged radially between the first gear wheel and the second gear wheel, while meshing with the two.

As can be seen more particularly in FIG. 4, the first gear wheel 30.1 of the first epicyclic train 28.1 is, for the first embodiment, secured to and coaxial with the downstream gear wheel 40.2 of the second upstream gear stage 40. In this example, the first gear wheel 30.1 of the first epicyclic train 28.1 and the downstream gear wheel 40.2 of the second upstream gear stage 40 are connected to each other by a transverse flange 41 which is arranged rearward relative to the epicyclic gear stage 28. The first gear wheel 30.1 of the first epicyclic train 28.1, whose axis is the main axis A2 (implied within the operating tolerances) extends axially forward along the direction of the axis A2 relative to this transverse flange 41 so as to engage between the planets 34.1 of the first epicyclic train 28.1, and to mesh with the planets 34.1 of the first epicyclic gear 28.1. The flange 41 therefore here forms a mechanical connection through which the input component 30.1 of the epicyclic gear stage 28 is connected upstream to the motor output part 20. It is seen that this mechanical connection is arranged behind the planet gear wheels 34.1 of the first epicyclic train 28.1, along the direction of the main axis A2.

In the second embodiment illustrated in FIG. 5, the first gear wheel 30.1 of the first epicyclic train 28.1 is directly secured to a rotor body 20' of the electric motor 16. The rotor body 20' here presents an outer annular section 20'*a* which supports for example a rotor winding or a series of permanent magnets 21' of the electric motor 16. The rotor body 20' is a body of revolution about the axis A1 of the electric motor which in this second example merges, within the operating tolerances, with the main axis A2 of the epicyclic gear stage 28. Conventionally, the rotor body 20' is received coaxially at the center of a stator 23 of the electric motor 16. The first gear wheel 30.1 of the first epicyclic train 28.1, whose axis is the main axis A2 (implied within the operating tolerances) extends axially forward along the direction of the axis A2 relative to a transverse flange 20'*b* of the rotor body 20' while being received at the center of the outer annular section 20'*a* of the rotor body 20'. As in the first embodiment, the first gear wheel 30.1 engages between the planets 34.1 of the first epicyclic train 28.1, and meshes with the planets 34.1 of the first epicyclic train 28.1. Also in this second embodiment, the mechanical connection between the input component 30 of the epicyclic gear stage 28 and the motor output part 20', here made by a transverse flange 20'*b* of the rotor body 20', is arranged behind the planet gear wheels 34.1 of the first epicyclic train 28.1, along the direction of the main axis A2.

In the two illustrated embodiments, the second epicyclic gear 28.2 also includes a first gear wheel 30.2 in the form of a central pinion with external gear teeth and a second gear wheel 32.2 in the form of a ring gear with internal gear teeth, here with four planet gear wheels 34.2 which are radially arranged between the first gear wheel and the second gear wheel of this second epicyclic train 28.2, while meshing with the two. As can be seen more particularly in FIG. 4 or in FIG. 5, the first gear wheel 30.2 of the second epicyclic train 28.2 is secured to and coaxial with the planet gear carrier 36.1 of the first epicyclic train 28.1, with as common axis the main axis A2 (implied within the operating tolerances). In this example, the planet gear carrier 36.1 of the first epicyclic train 28.1 includes a central structure 36.11 which extends perpendicularly to the main axis A2. The planet gear wheels 34.1 of the first epicyclic train 28.1 are arranged axially rearward along the direction of the main axis A2 relative to this central structure 36.11. On the contrary, the first gear wheel 30.2 of the second epicyclic train 28.2 extends axially forward along the direction of the main axis A2 from this central structure 36.11, so as to engage between the planet gear wheels 34.2 of the second epicyclic train 28.2, and to mesh with the planets 34.2 of the second epicyclic train 28.2. In both examples, the planet gear carrier 36.2 of the second epicyclic train 28.1 includes a central structure 36.21 which extends perpendicularly to the main axis A2. The planet gear wheels 34.2 of the second epicyclic train 28.2 are arranged axially rearward along the direction of the main axis A2 relative to this central structure 36.21.

In the examples, the output mechanical connector 24 is directly secured in rotation to the output component 36.2 of the epicyclic gear stage 28, these two elements therefore being rotatable about the main axis A2 (implied within the operating tolerances). Thus, it can be seen that the output mechanical connector 24 extends axially forward along the direction of the main axis A2 from the central structure 36.11 of the planet gear carrier 36.2.

In the examples illustrated, the output mechanical connector 24 of the actuator 10 has a cylindrical shape of revolution along the direction of the axis A2 (implying within the operating tolerances). Its front end is configured to form a mechanical connection making it possible to transmit the motion of the output mechanical connector 24 directly or indirectly to the mechanical member which must be driven by the actuator 10. In the two examples illustrated, this front end is thus tubular in shape along the main axis A2. It is for example provided with shapes favorable to the mechanical coupling, here by splines with an axis parallel to the main axis A2. Typically, with such a configuration, an output shaft having complementary splines can be axially engaged in the output mechanical connector 24 to allow the driving of the member by the actuator 10. It is therefore noted that the output mechanical connector 24, which is intended to be connected to the member of the land motor vehicle, forms a mechanical connection forward relative to the planet gear wheels 34.2 of the second epicyclic train 28.2 along the direction of the main axis A2.

The actuator 10 according to the invention includes an angular position sensor 42 including a detector 44 and a target 46. The angular position sensor 42 aims to give the most precise information possible as to the angular position of the member which is actuated by the actuator 10. For this, the actuator has an arrangement in which the angular position sensor 42 is capable of measuring with accuracy, and at a lower cost, the angular position of the output mechanical connector 24 of the actuator, in a direct manner, making it possible to eliminate any influence of possible clearances or imperfections in the internal mechanical transmission 18.

Preferably, the angular position sensor 42 is a non-contact type sensor. Such a non-contact sensor can for example be an Eddy current sensor, also called inductive type sensor, in which the detector 44 is able to create an electromagnetic field and to measure a value representative of an electromagnetic field. In an Eddy current sensor 42, the detector 44 includes for example a coil connected to an electronic component with integrated circuits, for example of the ASIC (Application-Specific Integrated Circuit) type. The target 46 of an inductive type sensor has electromagnetic properties which allow it, when it passes in front of the detector 44, to modify the properties of the electromagnetic field in such a way that this modification is detected by the detector. For example, the target includes metal elements in which the electromagnetic field created by the detector induces Eddy currents, these induced Eddy currents in return disturbing the electromagnetic field, which can be detected by the detector 44. Preferably, the angular position sensor 42 delivers information relating to the mechanical angular position of the two parts which are movable in rotation relative to each other about the main axis A2, one of which carries the detector 44 and the other carries the target 46.

In practice, it will often be easier to fix the detector 44 on a fixed part since the detector 44 is required to exchange information, in particular electrical measurement signals, with a larger system to which the angular position sensor can be integrated, for example a system for electronically monitoring the electric motor 16.

Advantageously, it can be seen in the figures that the target 46 of the angular position sensor 42 is arranged behind the epicyclic gear stage 28. More particularly, the position of the epicyclic gear stage 28 can be arbitrarily defined, along the direction of the main axis A2, as being that of at least one set of planet gear wheels 34.1, 34.2 of this epicyclic gear stage 28. Therefore, the target 46 of the angular position sensor 42 is, along the direction of the main axis A2, arranged behind the planet gear wheels 34.1, 34.2 along the direction of the main axis A2 of the epicyclic gear stage 28. This arrangement is particularly advantageous because it makes it possible to arrange the angular position sensor 42 in the casing 12 at a place which facilitates the integration into the actuator 10.

In the two examples illustrated, the actuator 10 includes a printed circuit board 48 which carries the detector 44 of the angular position sensor 42 and which is arranged in a plane perpendicular to the main axis A2, behind the epicyclic gear stage 28, therefore behind at least one set of planet gear wheels of this epicyclic gear stage 28 along the direction of the main axis A2. Typically, this printed circuit board 48 can include all or part of an electronic circuit for controlling the electric motor. This printed circuit board 48 can include all or part of an electronic circuit for preprocessing or processing the electrical signals provided by the detector 44, which signals are representative of the angular position measured by the angular position sensor. Such electronic circuits carried by the printed circuit board 48 can comprise at least one electronic calculation unit having for example a microprocessor, electronic memory and electronic input/output interfaces. It is advantageously provided that the printed circuit board 48 carries or is connected to a computer communication interface, for example a connector 50, which can also be carried by the printed circuit board. The connector 50 makes it possible to implement an electrical and/or computer connection. Of course, the connector 50 can be replaced or supplemented, as a computer communication interface, by an electronic wireless communication unit, for example of the Wifi®, Bluetooth® type or the like. An actuator thus equipped can be qualified as a "smart" detector. It is understood that by thus arranging the detector 44 behind the epicyclic gear stage 28, its integration into the casing 12 of the actuator 10 is facilitated.

On the other hand, to ensure the most accurate measurement possible of the angular position of the output mechanical connector 24, the target 46 of the angular position sensor 42 is secured in rotation to this output mechanical connector 24. For this, the target 46 is mounted in secured manner to a connecting rod 52 which is secured in rotation to the output mechanical connector 24 of the actuator 10 and which passes axially through the epicyclic gear stage 28 along its main axis A2.

In the examples illustrated, the output mechanical connector 24 is secured in rotation to the output component 36.2 of the epicyclic gear stage 28 so that the output component of the epicyclic gear stage 28 rotates, in operation of the actuator, at the same speed of rotation about the main axis A2 as the output connector 24 of the actuator and occupies the same angular position at all times. In this case, the connecting rod 52 is secured in rotation to the output component 36.2 of the epicyclic gear stage 28.

In the two examples illustrated, the output mechanical connector 24 is even rigidly linked to the output component 36.2 of the epicyclic gear stage 28, therefore with no clearance between the two, along any direction. However, it could be provided that the output mechanical connector 24 is secured in rotation to the output component 36.2 of the epicyclic gear stage 28, but with clearance between the two, along one or more directions perpendicular to the main axis A2, for example to allow a certain eccentricity and/or a certain axial deviation between the two, while maintaining an identical angular position of the output mechanical connector 24 with the output component 36.2 of the epicyclic gear stage 28.

The connecting rod 52 therefore extends along the main axis A2 and axially passes through the epicyclic gear stage 28. As can be seen in the figures, the target 46 is arranged on the connecting rod 52 facing a front face of the printed circuit board 48. However, it is understood that, alternatively, it could be arranged on the connecting rod 52 facing a rear face of the printed circuit board 48, the connecting rod 52 in this case passing through the printed circuit board 48.

In the first example illustrated in FIGS. 1 to 4, it is noted that the axis of rotation A1 of the motor output part 20 of the electric motor 16 is parallel to the main axis A2 of the epicyclic gear stage 28, the two axes being offset from each other. This configuration is obtained in this embodiment by the presence of at least one gear train with parallel axes, such as the first upstream gear stage 38 and/or the second upstream gear stage 40. This configuration is by example adapted to relatively short electric motors along the direction of their axis. In the case of longer motors along the direction of their axis, it can on the contrary be provided that the electric motor is arranged such that the axis of rotation of the electric motor is perpendicular to the main axis. In such a case, the internal mechanical transmission includes an angle transmission, which can be for example produced by a pair of bevel gears, or with a gear wheel having a gear teeth, called axial gear teeth, which is formed of gear teeth having a bottom-top extension along the direction of its axis of rotation, as described in document WO-2019/048753-A1. In the second example illustrated in FIG. 5, the axis of the motor output part 20' of the electric motor 16 is coaxial with the main axis A2 of the epicyclic gear stage 28.

In the two examples illustrated, the electric motor is arranged, along the direction of the main axis A2, in front of the printed circuit board 48 which carries the detector of the angular position sensor. The electric motor 16 is therefore arranged at the same height as the epicyclic gear stage 28, along the direction of the main axis A2. This layout is therefore favorable to the compactness of the actuator 10 along this direction.

Besides, in the first embodiment illustrated in FIGS. 1 to 4, the motor output part 20 is arranged behind the electric motor 16. In this case, the motor shaft 20 extends towards the rear of the electric motor 16. Here again, by the 180° folding of the motion transmission chain, the compactness of the actuator 10 is favored along the direction of the main axis A2.

In the first illustrated embodiment, there is at least one gear stage, here a first upstream gear stage 38 which, along the direction of the main axis (A2), is arranged behind the printed circuit board 48 that carries the detector 44 of the angular position sensor 42. Indeed, it can be seen that the motor output pinion 38.1 is secured to the motor shaft 20, which axially passes through the extension plane of the printed circuit board 48. In this example, the motion transmission chain therefore passes through twice the extension plane of the printed circuit board 48. This layout makes it possible to bring the angular position sensor 42, which is carried by the printed circuit board 48, closer to the output mechanical connector 24 of the actuator 10. This makes it possible to reduce the length of the connecting rod 52, and makes it possible to reduce the total volume of the actuator.

According to a notable aspect of the actuator, the connecting rod 52 also serves as a guide shaft for the elements of the epicyclic gear stage 28 which are driven by a rotational motion about the main axis A2 of the epicyclic gear stage 28.

Thus, the input component of the epicyclic gear stage, here the first gear wheel 30.1 of the first epicyclic train 28.1, is guided in rotation on the connecting rod 52 with a first diametrical guide clearance "jg1" relative to the main axis A2. This first diametrical guide clearance "jg1" is chosen as small as possible to reduce as much as possible the diametrical displacement of the input component relative to the connecting rod 52, while allowing the free rotation of the input component of the epicyclic gear stage 28 on the connecting rod 52 about the main axis A2. To allow the free rotation, the first diametrical guide clearance is positive.

In both examples, the output component of the epicyclic gear stage, here the planet gear carrier 36.2 of the second epicyclic train 28.2, is rigidly linked to the connecting rod 52. This can be achieved for example by a tight mounting of the output component on the connecting rod 52. Such a tight mounting can be likened to the presence of a strictly negative diametrical clearance between the output component and the connecting rod 52.

Due to their mounting on the connecting rod 52 with the smallest possible diametrical guide clearance, for the input component 30.1, or tight on the connecting rod 52, for the output component 36.2, these two components of the epicyclic gear stage 28 belong together with the rod 52 to a rotatable assembly of the epicyclic gear stage 28.

It is advantageously provided that the rotatable assembly of the epicyclic gear stage 28 is positioned relative to the actuator casing 12, diametrically relative to the main axis A2, with a diametrical displacement clearance "jd", the diametrical displacement clearance relative to the main axis A2 being at least 3 times greater than the first diametrical guide clearance "jg1" relative to the main axis A2, preferably at least 5 times greater than the first guide clearance "jg1".

In the two illustrated examples, it can thus be seen that the planet gear carrier 36.2 of the second epicyclic gear train 28.2 is received in the output well 12.1 of the casing 12 with a diametrical displacement clearance "jd" to limit the diametrical displacement of the rotatable assembly of the epicyclic gear stage 28 relative to the actuator casing 12.

For example, the first diametrical guide clearance "jg1" is less than or equal to 0.05 millimeters, while the diametrical displacement clearance "jd" is greater than or equal to 0.2 millimeters.

The diametrical clearance between two parts, relative to a given axis, is determined by measuring the maximum possibility of movement between the two parts along a direction perpendicular to the given axis.

In the second example illustrated in FIG. 5, the input component 30.1 of the epicyclic gear stage 28 is rigidly connected to the rotor body 20' of the electric motor 16. In this way, it is understood that, in this second example, the rotor body 20' of the electric motor 16 is also guided in rotation on the connecting rod 52 with the first diametrical guide clearance "jg1" relative to the main axis A2, here therefore by means of the input component 30.1 of the epicyclic gear stage 28. Similarly, it can be deduced that, in this second example, the rotor body 20' of the electric motor 16 is guided in rotation relative to the stator 16 via the epicyclic gear stage 28.

Remarkably, in the two examples illustrated, the rotatable assembly of the epicyclic gear stage 28 is, behind the epicyclic gear stage 28, free in rotational guidance and free in diametrical positioning relative to the casing. It can thus be considered that the rotatable assembly of the epicyclic gear stage 28 is mounted in a cantilevered manner behind the epicyclic gear stage 28. In particular, it can be seen that, in the examples illustrated, the rear end of the connecting rod 52 is free in rotational guidance and free in diametrical positioning relative to the casing.

On the other hand, it will be advantageously provided that at least one fixed component of the epicyclic gear stage is connected without clearance to the actuator casing 12. In the examples illustrated, the first epicyclic train 28.1 and the second epicyclic train 28.2 in series of the epicyclic gear stage 28 each include respectively a second gear wheel 32.1, 32.2, which are both made in the form of a ring gear with internal gear teeth. In the two examples illustrated, the second gear wheel 32.1 of the first epicyclic train 28.1 and the second gear wheel 32.2 of the second epicyclic train 28.2 are of different diameters, but it is understood that, in some embodiments, they could be of the same diameter. In the two examples illustrated, the second gear wheel 32.1 of the first epicyclic train 28.1 and the second gear wheel 32.2 of the second epicyclic train 28.2 are made in one piece, but it is understood that they could be made in two separate parts. In the two examples illustrated, the second gear wheel 32.1 of the first epicyclic train 28.1 and the second gear wheel 32.2 of the second epicyclic train 28.2 are made in the form of a common cylindrical part of revolution about the main axis A2. This common part is advantageously rigidly fixed relative to the casing. It could be integrally formed in one piece with at least part of the casing, and/or with an inner wall of the casing, and/or be fixed by detachable or non-detachable means (screws, rivets, snap-fastening, welding, bonding . . . ) on part of the casing 12 and/or an inner wall connected to the casing 12. In operation, the fixed component(s) of the epicyclic gear stage 28 thus have a fixed position relative to the casing.

However, it is understood that, at the level of the epicyclic gear stage 28, the planet gear wheels which, in the examples illustrated are mechanically interposed between on the one hand the rotatable input and output components and on the other hand the fixed components, ensure a form of diametrical positioning between on the one hand the rotatable input and output components and on the other hand the fixed components which are connected without clearance to the casing of the actuator. In statics, this diametrical positioning is relatively inaccurate, with therefore a significant displacement clearance, for example greater than 0.2 millimeters. On the other hand, in operation, the meshing forces which occur in the epicyclic gear stage 28 tend to determine a relative position between on the one hand the rotatable assembly of the epicyclic gear stage 28 and on the other hand the fixed component(s) of the epicyclic gear stage. In this way, this positioning in operation of the rotatable assembly is achieved without adding additional rotational guidance, and therefore by limiting the parasitic transmission forces. It is recalled that, in the second exemplary embodiment of FIG. 5, this positioning in operation of the rotatable assembly implies the same positioning in operation of the rotor body 20' of the electric motor 16 relative to the stator 23.

In a set of planet gear wheels of an epicyclic train, the planet gear wheels are angularly distributed in a uniform manner about the main axis. This makes it possible to balance the meshing forces in operation, which contributes to a natural centering of the rotatable components of the epicyclic train. Thus, each epicyclic train can have at least two planet gear wheels arranged at 180° from each other about the main axis A2, but preferably at least three planet gear wheels arranged at 120° from each other about the main axis A2 or for example four planet gear wheels arranged at 90° from each other about the main axis A2, etc. Thus, in the examples, with sets of planet gear wheels in each of which the planet gear wheels are angularly distributed in a uniform manner about the main axis A2, the rotatable assembly of the epicyclic gear stage 28 tends to center relative to the fixed components of the epicyclic gear stage 28 namely, in the illustrated examples, the two ring gears with internal gear teeth 32.1 and 32.2. This centering is preferably authorized by the displacement clearance between the rotatable assembly and the casing 12. This further limits a little more the parasitic transmission forces inside the epicyclic gear stage 28.

In summary, the rotatable assembly of the epicyclic gear stage 28 is mounted in a floating manner relative to the casing, diametrically relative to the main axis A2, and the planet gear wheels of the epicyclic gear stage 28 are angularly distributed in a uniform manner about the main axis A2 to ensure, in operation, a natural centering under force of the rotatable assembly of the epicyclic gear stage 28 relative to the casing.

In the two examples illustrated, the epicyclic gear stage 28 includes, in addition to its input component and to its output component, other components which, in operation, are rotatable about the main axis A2. In particular, the first epicyclic train 28.1 includes its planet gear carrier 36.1 which is rotatable about the main axis A2. Similarly, the second epicyclic train 28.2 includes its first gear wheel 30.2 which is also rotatable about the main axis A2. It is recalled that, in the illustrated examples, these two components are secured to each other, for example made in the form of a single piece. This or these other rotatable component(s) can also be advantageously guided in rotation on the connecting rod 52 with a second diametrical guide clearance "jg2" relative to the main axis A2. The second diametrical guide clearance "jg2" can be equal to the first diametrical guide clearance "jg1". However, in some variants, these inner rotatable components, other than the input component and the output component, can on the contrary be simply positioned diametrically relative to the connecting rod 52, in this case with a diametrical displacement clearance relative to the main axis A2 which will be typically at least three times greater than the first diametrical guide clearance "jg1" relative to the main axis A2, preferably at least five times greater than the first diametrical guide clearance "jg1".

The invention claimed is:

1. An actuator for a member of a land motor vehicle, the actuator having an actuator casing which delimits an internal volume, comprising:
   at least one electric motor having a motor output part, the motor output part having an axis of rotation, and
   a mechanical transmission comprising at least one reduction gear train to transmit a motion of the motor output part of the electric motor to a output mechanical connector of the actuator,
   wherein the at least one reduction gear train comprises at least one epicyclic gear stage having an input component that has a speed of rotation, and an output component that has a speed of rotation, the input component and the output component, which are rotatable relative to the casing about a main axis having a direction and at least one set of planet gear wheels, the speed of rotation of the input component being greater than the speed of rotation of the output component,
   wherein the input component is mechanically connected to the motor output part by a mechanical connection which is arranged, along the direction of the main axis, behind the at least one set of planet gear wheels along the direction of the main axis, and the output mechanical connector is intended to be connected to the member of the land motor vehicle by a mechanical connection towards a front of the at least one set of planet gear wheels along the direction of the main axis,
   an angular position sensor including a detector and a target,
   wherein the target of the angular position sensor is arranged, along the direction of the main axis, behind the at least one set of planet gear wheels along the direction of the main axis of the epicyclic gear stage and is mounted in a secured manner on a connecting rod which is secured in rotation to the output mechanical connector of the actuator; and which axially passes through the epicyclic gear stage along its main axis,
   wherein the input component of the epicyclic gear stage is guided in rotation on the connecting rod with a first positive diametrical guide clearance relative to the main axis,
   wherein the output component of the epicyclic gear stage is rigidly connected to the connecting rod,
   wherein at least one fixed component of the epicyclic gear stage is connected without clearance to the actuator casing, and
   wherein the input component and the output component of the epicyclic gear stage belong to a rotatable assembly of the epicyclic gear stage which is positioned relative to the actuator casing, diametrically relative to the main axis, with a positive diametrical displacement clearance relative to the main axis to limit a diametrical displacement of the rotatable assembly of the epicyclic gear stage relative to the actuator casing, the diametrical displacement clearance being at least three times greater than the first diametrical guide clearance,
   wherein the at least one epicyclic gear stage comprises an epicyclic train including a first gear wheel and a second gear wheel each having a symmetrical axis of revolution which coincides with the main axis, and including at least one set of planet gear wheels mounted in free rotation on a planet gear carrier, and in that the planet gear carrier forms the output component of the epicyclic gear stage.

2. The actuator according to claim 1, wherein the diametrical displacement clearance is at least five times greater than the first diametrical guide clearance.

3. The actuator according to claim 1, wherein the first diametrical guide clearance relative to the main axis is less than or equal to 0.05 millimeters, and the diametrical displacement clearance relative to the main axis is greater than or equal to 0.2 millimeters.

4. The actuator according to claim 1, wherein the epicyclic gear stage comprises several epicyclic trains in series.

5. The actuator according to claim 4, wherein the epicyclic trains in series of the epicyclic gear stage each include a first gear wheel and a second gear wheel each having a symmetrical axis of revolution that coincides with the main axis, and each including at least one set of planet gear wheels mounted in free rotation on a planet gear carrier, and in that the planet gear carrier of a last of the epicyclic trains forms the rotatable output component of the epicyclic gear stage.

6. The actuator according to claim 5, wherein the first epicyclic train comprises the first gear wheel with external gear teeth which forms the rotatable input component of the epicyclic gear stage, and in that the first epicyclic train and the last epicyclic train each include the second gear wheel with internal gear teeth which are fixed components of the epicyclic gear stage and which are connected without clearance to the actuator casing.

7. The actuator according to claim 6, wherein the first epicyclic train comprises the planet gear carrier which carries the set of planet gear wheels of the first epicyclic train and which is guided in rotation on the connecting rod with a guide clearance.

8. The actuator according to claim 6, wherein the last epicyclic train comprises a first gear wheel with external gear teeth which is guided in rotation on the connecting rod with a guide clearance.

9. The actuator according to claim 1, wherein the rotatable assembly of the epicyclic gear stage is, along the direction of the main axis, behind the epicyclic gear stage, free in rotational guidance and free in diametrical positioning.

10. The actuator according to claim 1, wherein, in a set of planet gear wheels of an epicyclic train, the planet gear wheels are angularly distributed in a uniform manner about the main axis.

11. The actuator according to claim 1, wherein the axis of rotation of the motor output part of the electric motor is parallel to the main axis.

12. The actuator according to claim 1, comprising a printed circuit board which carries the detector of the angular position sensor, and which is arranged in a plane perpendicular to the main axis, behind the at least one set of planet gear wheels along the direction of the main axis, and in that the target is arranged on the connecting rod facing a front face of the printed circuit board.

13. The actuator according to claim 1, wherein the electric motor is arranged, along the direction of the main axis, in front of a printed circuit board which carries the detector of the angular position sensor.

14. The actuator according to claim 13, wherein the at least one reduction gear train comprises at least one gear stage which is arranged, along the direction of the main axis, behind a printed circuit board which carries the detector of the angular position sensor.

15. The actuator according to claim 1, wherein the motor output part is arranged along the direction of the main axis behind the electric motor.

16. The actuator according to claim 14, wherein the at least one gear stage which is arranged along the direction of the main axis behind the printed circuit board comprises a motor pinion which is secured to a motor output shaft, which axially passes through the plane of the printed circuit board.

17. The actuator according to claim 1, wherein the axis of rotation of the motor output part of the electric motor is perpendicular to the main axis.

18. The actuator according to claim 1, wherein the axis of rotation of the motor output part of the electric motor is coaxial with the main axis.

19. The actuator according to claim 1, wherein the angular position sensor is an Eddy current sensor.

* * * * *